United States Patent [19]

Burns

[11] Patent Number: 5,170,257
[45] Date of Patent: Dec. 8, 1992

[54] METHOD AND APPARATUS FOR CALIBRATING HALFTONE OUTPUT FROM AN IMAGESETTING DEVICE

[75] Inventor: James M. Burns, Austin, Tex.

[73] Assignee: Southwest Software, Inc.

[21] Appl. No.: 592,022

[22] Filed: Oct. 2, 1990

[51] Int. Cl.$^5$ .............................................. H04N 1/23
[52] U.S. Cl. ................................... 358/298; 358/455; 358/456; 358/458; 358/461
[58] Field of Search ...................... 358/298, 455–461, 358/406, 80, 214; 346/108, 160; 395/107, 109

[56] References Cited

U.S. PATENT DOCUMENTS

| | | |
|---|---|---|
| 4,004,079 | 1/1977 | Boston ............................... 358/302 |
| 4,075,662 | 2/1978 | Gall . |
| 4,314,281 | 2/1982 | Wiggins et al. . |
| 4,500,919 | 2/1985 | Schreiber . |
| 4,757,334 | 7/1988 | Volent . |
| 4,833,627 | 5/1989 | Leszczynski ....................... 395/145 |
| 4,903,141 | 2/1990 | Morton et al. . |

OTHER PUBLICATIONS

Listing of an "Aldus Printer Description File" (Jun. 9, 1988).
Aldus Preprint Program User's Guide (Mar., 1990).
Adobe Photoshop Program User's Guide (Feb. 6, 1990).
Color Studio User's Guide and Retouching/Separation Package (Mar. 6, 1990).
Color Calibration Software for PostScript Image Setters (Feb. 22, 1990).
*Desktop to Press*, vol. 1, No. 5 (Mar., 1990).

*Primary Examiner*—George H. Miller, Jr.
*Assistant Examiner*—Scott A. Rogers
*Attorney, Agent, or Firm*—Arnold, White & Durkee

[57] ABSTRACT

An improved method and apparatus for calibrating halftone output images is provided which calibrates subsequent halftone input images with varying imagesetter outputs such as image resolutions, exposure intensities and screen frequencies. Calibration is programmably achieved by programmably selecting a specific calibration set for each corresponding uncalibrated halftone input image. The selected calibration set and mapping transfer function automatically compensates or adjusts the uncalibrated input image for any value of resolution, intensity and screen frequency to produce a calibrated halftone output image in either positive or negative sense output and usable on either paper or film photographic medium. Once the calibrated halftone output is programmably produced, it can then be photoprocessed according to conventional chemical processing means. The present invention represents a substantial improvement in precision and speed by which halftone output images are calibrated in the typeset industry.

14 Claims, 3 Drawing Sheets

METHOD AND APPARATUS FOR CALIBRATING HALFTONE OUTPUT FROM AN IMAGESETTING DEVICE

BACKGROUND OF THE INVENTION

Incorporated herein is a computer program listing printout appendix of source code used to generate calibration sets and calibration transfer functions of a test pattern to enable calibration of halftone output images according to the present invention. Copyright, 1990, Softwest Software Inc. A portion of the disclosure of this patent document contains material which is subject to copyright protection. The copyright owner has no objection to the facsimile reproduction by anyone of the "Program Printout Appendix", as it appears in the Patent and Trademark Office Patent file or records, but otherwise reserves all copyright rights whatsoever.

This invention relates to a method and apparatus for calibrating halftone output images from an imagesetting device. In particular, the present method and apparatus comprises steps and devices involved in producing a plurality of calibration sets and in using those calibration sets to adjust the uncalibrated halftone input images to produce calibrated output images as a function of image resolution, exposure intensity and screen frequency. Further, the calibration sets can be generated to produce halftone output images on either film or paper and for either positive or negative representation of the halftone input image.

Typically, there are four fundamental steps involved in producing typeset-quality output from a computer front end publishing system such as, e.g., a PostScript imagesetter (or typesetter). First, an application programed (a drawing or page layout package) is used to find what is wanted or actually printed on the paper or film. Second, the "print" option from the program is used to start the printing process. Typically, the print option translates what is seen on the screen into a page description language that the imagesetter can recognize. The page description language is what is then sent to the imagesetter.

Many conventional imagesetter systems consist of raster image processors (RIP) and recorders. An exemplary RIP is one sold under the Model No. RIP-30 by Linotype Company of Hauppauge, N.Y. The RIP performs the third step in the process by converting the page description language sent to it from the front end into a raster or a grid of lines. Each line contains a series of pixels, which can be considered as a list of dots which turn on or off to form the image. In the fourth step, the RIP sends this raster to the recorder, which uses a modulated light source to expose the image onto either photographic film or paper. An exemplary recorder is one sold as Model No. Linotype-330, also by Linotype Company. The photographic medium, in a light-tight takeup cassette, is then removed from the recorder and photo developed by a conventional chemical process.

All imagesetters have a light source intensity adjustment to provide proper exposure of the film. Exposed areas turn black on both photographic film medium or paper medium after development. The amount or degree of blackness, called "density" is a function of how much the film is exposed. Strictly speaking, density is a measure of how much light is blocked by a piece of film. Conversely, if photographic paper is used, density is the measure of how much light is not reflected. Higher density values correspond to a "blacker" piece of film.

These films are typically used in the publishing industry to make contact printing plates. For reasons of quality and ease of production in printing plate manufacture, it is desirable that the maximum density measurement on a film be in excess of 4.00. The maximum density available is a function of the light source intensity, the photographic medium and the process and chemicals used for development.

Since conventional printing processes cannot reproduce continuous tone tints or images, gray scales (tints) and halftones are approximated in page description languages by overlying a halftone grid on top of the recorder's pixel grid. The halftone grid, often called a screen, is specified by the number of halftone cells per inch (or lines per inch) and the angle from the vertical by which the halftone grid is rotated. Each cell of the half tone grid encompasses a specific number of pixels of the recorder's pixel grid. A continuous tone image is simulated by assigning a gray value to each halftone cell contained within the image. Thus, imagesetters which use PostScript ® are unable to produce shades of gray directly, generally approximate shades of gray by utilizing the aforementioned halftone technique. Halftone grids overlying the top of the pixel grids allows for a shade of gray to be approximated by turning a certain percentage of pixels on. The gray value of the halftone is obtained by averaging the gray continuous tone values contained within the dimensional boundaries of the halftone cell. Each halftone cell approximates a shade of gray by turning on, in dot shape, a certain percentage of the pixels contained within the cell. As the cell needs to be darker, more of the pixels are turned on. Theoretically, a 50% gray tint is made by turning on 50% of the pixels in a half-tone cell. These conventional techniques are well known in the art.

Associated with halftones is the problem commonly discovered by densitometers. A densitometer is a scientific instrument that measures density, or the ability of a piece of film to block light. The blacker the film, the more light it absorbs, and the higher the density reading on the densitometer. When measured with a densitometer, a halftone area that was supposed to be 50% gray will typically (for paper positive) be darker, because the higher exposure intensity needed for a higher maximum density (Dmax) tends to expand the pixel size, causing the overall halftone-dot to be larger than it actually is. Thus, halftone images, when uncalibrated, produce a gray value which is typically darker than that which the gray value should be. That is, when 50% of the pixels within a halftone cell are exposed, the resulting dark area covers more than 50% of the area contained by the halftone cell. At a dot area value of 0%, none of the halftone cell's pixels are exposed; at 100% dot value area, all of the pixels are exposed. Both 0% and 100% are always obtainable, therefore a non-linear relationship exists between the commanded dot area (or gray value) and the dot area actually achieved. A series of tint boxes in 5% intervals between 0% and 100% is commonly called a "gray scale".

The non-linear response of the gray scale is a function of the resolution of the recorder pixel grid, the light source intensity, the photographic media (film or paper) and the screen grid. These, however, are not the sole contributors to gray scale non-linearity. Contributing factors include the recorder light source, different film batches and photoprocessor chemicals.

Page description languages referred to hereinabove usually contain a mechanism to correct for non-linearities in gray scale and halftone output. An exemplary page description language is one sold under the trade name PostScript ®, by Adobe Systems Inc. of Mountain View, Calif. The mechanism Adobe included in PostScript ® is called the "transfer function", and it provides the lowest level means to calibrate the imagesetter to correct for non-linear gray scale response. Postscript ® transfer functions suffers an important disadvantage in not having the ability to compensate for all the numerous variables which typically cause the non-linear response, e.g., resolution variation in media, resolution, screen frequency exposure intensity, etc.

Not only are conventional imagesetters, and transfer functions therein, lacking in necessary complexity so as to compensate for numerous variations in, e.g., the resolution of the image to be calibrated, the exposure intensity of the to-be-developed image, the screen frequency, etc., but conventional devices also cannot produce precision transfer functions applicable to color image processing. Current imagesetters are black and white devices and "process color" reproductions are produced by overprinting the colored inks yellow, cyan, megenta and black. The colors of an image are "separated" into yellow, cyan, megenta and black components and are then outputted on black and white film in precise percentages. The films, called color separations, represent the amount of process color needed in each area of the page, and are used to make the printing plates. The imagesetter produces black and white, and the ink used with the final printing plate produces color. The RIP and imagesetter mechanism that produces tints and halftones also produces color separations. The key difference is that each color separation is rotated with respect to the others and its respective line per inch specification is slightly different. The rotation and change in lines per inch specification avoids the dots lining up in a moire pattern. While gray scale calibration is mostly insensitive to rotation, it is a function of the halftone lines per inch.

Gray scale calibration is well known in the industry. A series of pre-determined gray scale tint boxes, at pre-determined dot areas, are requested of the RIP and imagesetter, through the page description language, and each tint box on the resulting film is measured with a dot-area densitometer described hereinabove. The resulting measurement, called a "transfer curve" is then used to adjust the requested dot area by an amount necessary to achieve calibrated output.

However, as mentioned above, conventional transfer curves suffer many inherent disadvantages. Existing art divides the method in which the gray scale calibration adjustments are effected into two categories: application program-based and RIP-based. In application program-based gray scale calibration, an attempt is made to compensate for the non-linearities by sending an adjusted transfer curve immediately before the print job. This process is tedious and error prone because it requires an operator to construct a transfer curve under identical output conditions to the present, and to properly identify and select a specific curve to be sent with the print job. This process is duplicated for each application program, and for each imagesetter. If there are multiple front ends sending the imagesetter print jobs, then the files containing the curves must be distributed and managed. The number of transfer curves can become unruly. In an effort to reduce the number of transfer curves required, conventional methods require limiting the number of output conditions which can be specified. For instance, if film negatives at high resolutions of 150 lines per inch was the only output condition, then only one transfer curve per application, per imagesetter would be required. This is typically the case for closed reproduction systems, such as that mentioned in U.S. Pat. Nos. 4,075,662 and 4,500,919. The limitation on output conditions, however, is unrealistic and impractical with multi-function RIPs and imagesetters such those used in Model Nos. RIP-30 and Linotronic-330. A typical production environment using this equipment may require 24 transfer curves, for 5 applications, for 2 imagesetters. This would yield 240 separate transfer curves ($24 \times 5 \times 2 = 240$). If these curves were distributed among four front ends, then the operator would have to manage 960 separate files. In practice, the number of transfer curves used is a balance of output flexibility versus the number of curves to manage.

The second method by which conventional calibration adjustments are made, or RIP-based calibration, was formed as an attempt to reduce the number of curves and files required to support a minimum of output flexibility. Thus, RIP-based calibration is an approach used to calibrate the RIP and the imagesetter as a unit, so that all front ends and all application programs assume the device produces a linear gray scale. This process requires an operator to construct a transfer curve under identical output conditions to the present, and to properly identify and select that curve for use in the RIP and imagesetter. In the existing art, the operator loads the single curve into violative memory within the RIP. This is not repeated for each application programmable front end. In our example, this has the net effect of reducing a number of transfer curves needed from 240 to 48, and the number of files from 960 to 48. Although RIP-based calibration is effective in reducing the number of transfer curves, current RIP-base calibration techniques do not utilize many of the variable inputs which can effect the transfer curve. Furthermore, conventional RIP-based calibration requires manual selection and loading of the transfer curve appropriate to the current output conditions. Manual selection and loading for each transfer curve is not only inefficient but difficult to incorporate and thus, it is error-prone.

Accordingly, current calibration methodology requires that separate transfer curves be constructed to account for the plurality of variable inputs. Included with those inputs is either positive or negative output sense conditions. Images can be outputted in either a positive or negative format, one format or sense being the inversion of the other. Images, lines and type in a page description language are usually specified from the front end in a positive sense. The RIP and imagesetter can output any positive sense, or can switch to a negative independent of the page description. The negative sense is useful in many printing processes. Conventional methods for specifying a negative output sense are as follows:

1. Mathematically, through the transfer function and its interaction with the page description language. This method converts a gray value to negative by subtracting the gray value from 100 prior to halftone dot generation. Hence, a 0% gray value becomes 100%, 25% becomes 75%, etc.

2. Electronically, by inverting the pixel stream in the RIP prior to it leaving the RIP. A gray value is converted to a raster-based halftone dot, the halftone dot is placed in the RIP's raster memory, and after the complete page description is processed, the raster memory is transferred from the RIP in serial fashion to the recorder. Each bit in the pixel stream is inverted; that is, if the bit were on, it is turned off, if the bit were off, it is turned on. This produces a negative image, but because it has the effect of "turning the halftone dot inside out" the transfer curve required to produce the negative calibrated output is substantially different from that used with the mathematical negative.

3. Electronically, by inverting the pixel stream in the recorder immediately after it enters the recorder. This method is substantially similar to the second method above, and uses the same transfer as the second method in order to calibrate.

In practice, these methods are multiplicate in nature. That is, each of the three output sense settings shown above are set either positive or negative, and combine to produce an image. The negative of a negative is a positive. For example, the first method shown above places the output sense setting as positive, and the second and third method each set output sense setting as positive and the resultant image is positive. However, if method one places sense setting as negative, but method two places sense as negative and method three as positive, the resultant image is also positive. The transfer curve for these two cases, however, are different and this must be recognized by the operator for successful calibration. Thus, regardless of which method is used or whether or not the methods are multiplicated such that more than one method is used, an operator must set the methodology each time positive or negative output sense conditions are specified. Accordingly, conventional methods shown above which set sense output are often prone to operator error.

The net result of conventional art and all the complexities described hereinabove, is that halftone calibration for imagesetters with multiple output conditions such as, e.g., resolution, media, halftone frequency, screen intensity and sense/polarity output, is non-intuitive, labor-intensities, tedious and therefore error prone. Current methods require an inordinate amount of attention from the operator for success.

SUMMARY OF THE INVENTION

The problems outlines above are in large part solved by the method and apparatus of the present invention. That is, the halftone output image calibration method and apparatus hereof provides programmable convenience capability in programming imagesetters with variable output conditions. More specifically, the present invention is capable of calibrating halftone output images at various image resolutions, exposure intensities and screen frequencies. Thus, by simply changing, in software, input variables such as resolution, intensity, frequency, sense (polarity) and/photographic medium (film or paper), a more precisely calibrated halftone output is achieved from standard imagesetting devices. The present invention takes into account many variables in its calibration method and apparatus so that a more precisely calibrated output is achieved.

Broadly speaking, the present invention contemplates a method of calibrating halftone output images obtained from a standard imagesetting device. In this method of calibrating halftone output images, a halftone input image is provided with targeted or requested gray value density. The halftone images are then chemically processed and reproduced on photographic media. The resultant gray values of each halftone image is a function of image resolution, exposure intensity and screen frequency. A densitometer is used to measure the density of each halftone image, and a plurality of calibration sets are then generated corresponding to the variation between the requested gray value density and the respective measured density reading from the densitometer. The calibration sets are then used to convert subsequent plurality of halftone input images to respective plurality of calibrated halftone output images. The method of calibrating halftone images further includes storing the calibrations sets in a local memory medium and programmably retrieving a selected calibration set so as to convert the subsequent halftone input image to a calibrated halftone output image. Conversion, or calibration, can compensate for variation in the imagesetting device's current settings of image resolution, exposure intensity and screen frequency. The calibration method can also calibrate depending upon whether or not the calibrated halftone output image is to be positive or negative or is received on either film or paper photographic medium.

As a further embodiment, the present invention also contemplates a method of calibrating halftone output images from an imagesetting device comprising providing a halftone input image with requested gray value densities, wherein each gray value density is a function of image resolution, exposure intensity and screen frequency of the input image. The uncalibrated halftone input images are chemically processed and thereby exposed on photographic medium so that they can be measured by a densitometer. A plurality of calibration sets are then generated corresponding to the variation between the requested gray value density and the density measured by the densitometer for each halftone input image and at varying values of image resolution, exposure intensity, screen frequency and photographic medium which is to receive the resultant halftone output image. Subsequent halftone input images can be mapped through a transfer function curve or process capable of transferring either positive or negative gray value densities of the subsequent halftone input image to either positive or negative gray value densities of calibrated halftone output image.

The present invention also contemplates an apparatus for generating calibrated halftone output images from an imagesetting device, comprising a halftone input image having a plurality of gray values representing various shades of the halftone input image. Means is provided for converting the input image into a page description languages recognizable by a computer. A raster image processor within the computer is configured for receiving the page description language and converting that language into a raster representation of the halftone input image. A recorder is also connected to the raster image processor to expose the raster representation onto a photographic media such as paper, film, etc. A photoprocessor is then configured to receive the media for chemically developing the photographic media. A densitometer is used to measure the density of each gray value developed photographic media. The variations between measured density of the densitometer and corresponding actual density in entered into a computer in the form of programmed calibration sets. Thus, subsequent uncalibrated halftone input images, which are converted into page description language and inputted into the computer, are applied to a corresponding selected calibration set stored in the computer. The selected calibration set programmably adjusts the uncalibrated halftone input image to produce a calibrated halftone output image. Mapping means is provided for mapping either positive or negative sense representations of the subsequent uncalibrated halftone input images through the raster image processor, recorder, photoprocessor and then outputted on the photographic medium as calibrated positive or negative sense output halftone images. The raster image processor, in conjunction with programmably selected calibration sets and transfer function, provides for rapid and precise calibration of halftone output images before they are photoprocessed.

Therefore, the present application contemplates a new system for calibrating halftone output from imagesetting devices. In one aspect of the invention, a special test strip pattern is constructed from an uncalibrated halftone input image into page description language of the imagesetting device. The test strip pattern contains gray scale requests. This pattern is outputted in an uncalibrated or unadjusted fashion from the imagesetter, developed with a photoprocessor and then measured with a densitometer for its actual density or percent dot area. These measurements, called the halftone response function, combine with the output sense, resolution, exposure intensity and screen frequency with which the test strip was created in order to ultimately produce a polarity of calibration sets.

The calibration set construction process is repeated for each combination of resolution, exposure intensity, and screen frequency of which the operator wishes to calibrate. The calibration set is used in a transfer function process, in which all requested gray values are mapped to values so chosen to provide calibrated output, that is, gray value output measured with a densitometer as being equal to that gray value requested. Thus, the present invention achieves gray value calibration by programmably compensating or adjusting, via calibration sets, the uncalibrated halftone input image. The transfer function used for calibration is the inverse of the halftone response function. the halftone response function is inverted through a look-up table combined with an interpolation process.

In another aspect of the present invention, the plurality of calibration sets are deposited in a raster image processor in such a fashion that once deposited, they no longer require any operator attention for successful use other than periodic checks to verify their continued accuracy. Further, since the calibration sets are deposited in the raster image processor, each is available for use independent of the application program or the page description. A calibration set (and its resulting transfer curve) is automatically selected for use depending upon the current imagesetter setting or resolution, exposure intensity and halftone screen frequency.

In still a further aspect of the present invention, the present method and device provides means by which a transfer curve is programmably provided so that halftone output image sense is mathematically derived from the halftone input image and all the output sense conditions along with resolution, intensity and screen frequency. Namely, a single calibration set at a resolution, exposure intensity and halftone screen frequency is used to calibrate both positive and negative images, whether or not the images are produced with mathematical or electronic inversion included.

DETAILED DESCRIPTION OF THE PREFERRED EMBODIMENTS

Figure 1:
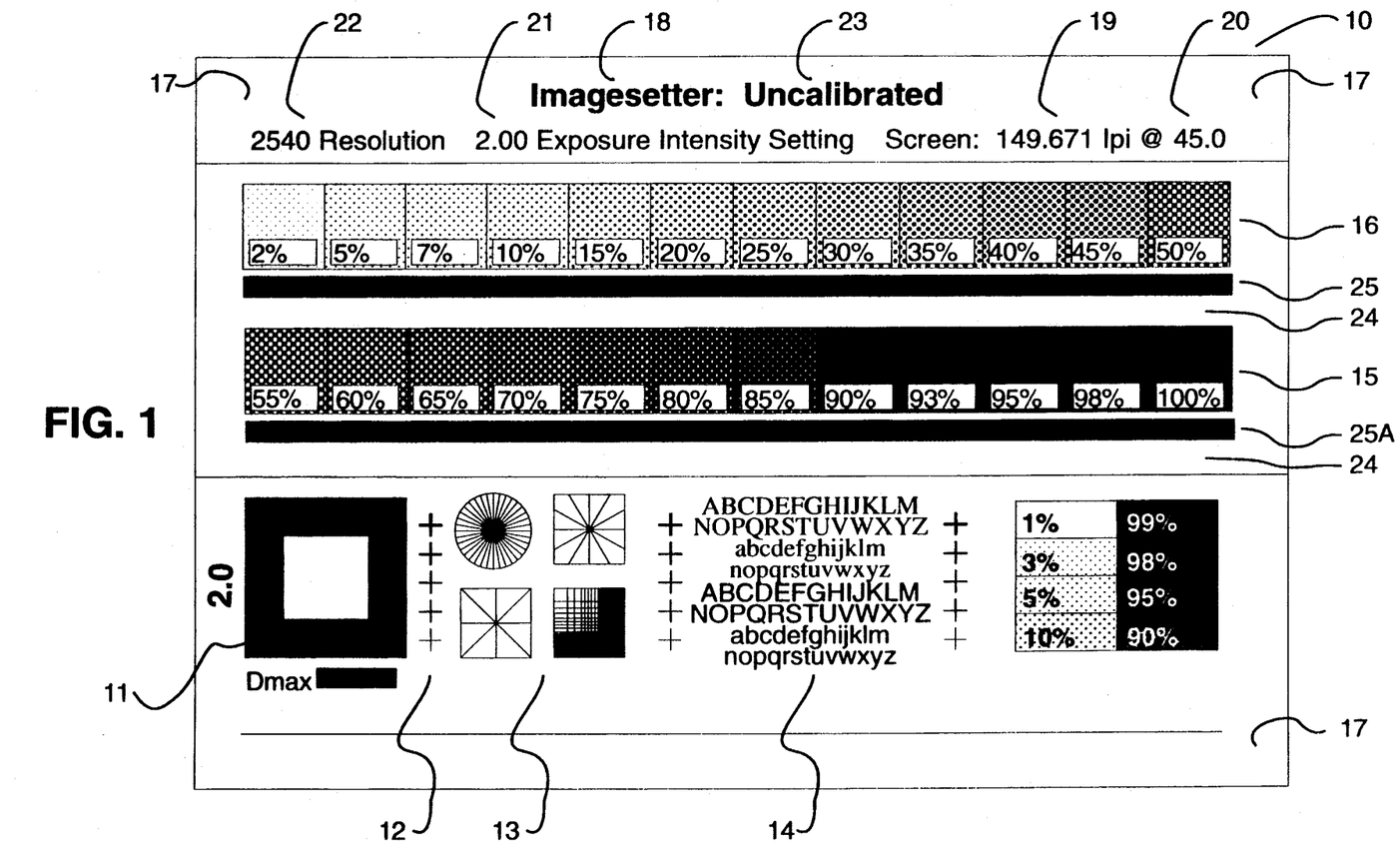
FIG. 1 is a plan view of a sample test strip pattern used by the present invention in setting the imagesetter exposure intensity setting and generating halftone response function for calibration set construction.

Referring to the drawings, FIG. 1 illustrates a sample test strip pattern used by the present invention. In particular, FIG. 1 illustrates an exemplary uncalibrated halftone input image processed in the form of a test pattern 10 representing numerous indicia usable for subsequent calibration of halftone input images. Included within pattern 10 is a solid area 11 along with targets 12, 13 and 14. Targets 12, 13 and 14 are useful in setting the exposure intensity of the halftone image to as a high a value as possible without overexposing the image placed on a media such as film. Solid area 11 and targets 12, 13 and 14 are examined on pattern 10 for evidence of film overexposure so that corrections can be made prior to the imagesetting process. Also included in test pattern 10 are two gray scales 15 and 16 usable in measuring various degrees of densities or gray values ranging between 2% and 100%. 0% is capable of being read from any clear space 17 on pattern 10. It is important to note that pattern 10 is merely a sample and does not indicate all the various forms of test patterns which can be obtained by the present invention. Furthermore, pattern 10 is placed upon a photographic media such as a film so that density readings can be obtained therefrom by a standard densitometer. It is envisioned, however, that other forms of photographic media may be used provided densities can be read therefrom by a standard densitometer. Thus, photographic media such as paper or photographic plates are also possible.

Included for identification of an operator viewing test pattern 10, is the imagesetter name 18 and various parameters which effect the calibrated halftone output image such as, e.g., screen frequency 19, angle of rotation 20 of the halftone image with respect to the type set page, the imagesetter light source exposure intensity 21 and the imagesetter pixel grid resolution 22. Also shown is indicator 23 useable for determining if the gray scale shown on pattern 10 is uncalibrated output (as shown in FIG. 1) or an attempt at calibrated output (not shown). Thus, FIG. 1 illustrates uncalibrated halftone test pattern 10 usable for establishing calibration sets disclosed hereinbelow. Included under each gray scale tint box (2%-100%), is an area 24 usable for recording gray scales with positive output sense. Area 25A is used for recording gray scale areas with negative output sense. Thus, the sample test pattern 10 shown in FIG. 1 is produced with a positive output since area 25A contains positive-output-sense-recorded test patterns.

Figure 2:
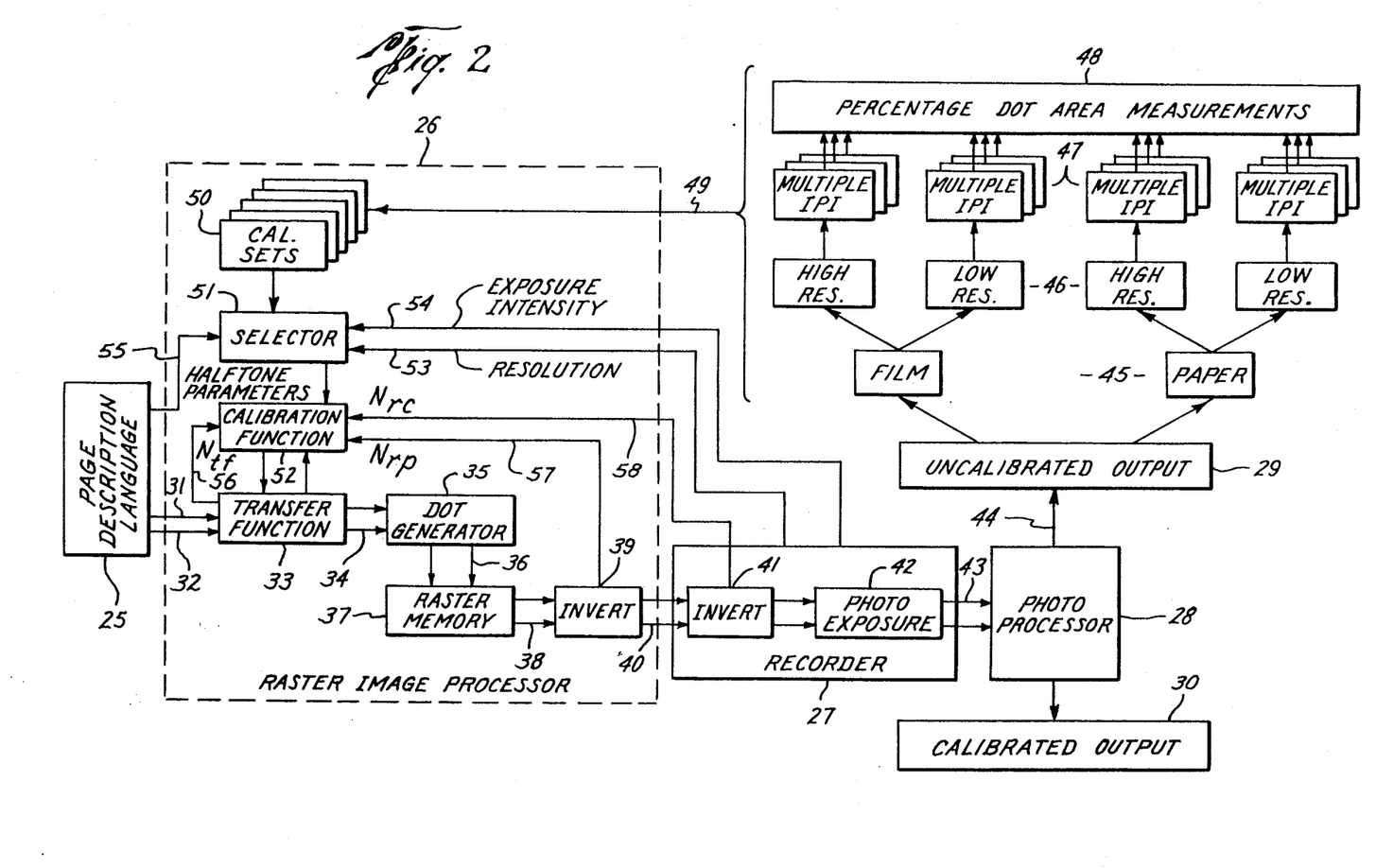
FIG. 2 is a diagrammatic block representation of the present invention showing various components along with the flow of data and steps used in the calibration process; and, FIG. 3 is a graph depicting the method by which, given a calibration set selected for resolution, exposure intensity and halftone screen frequency, the transfer function is derived for the proper output sense condition.

Turning now to FIG. 2, calibrated halftone output images are created by computer front-ends in a page description language 25 as shown. Language 25 is then sent to an imagesetter comprised of a raster image processor, or a RIP, 26. RIP 26 then converts language 25 into a raster format which is then sent to recorder 27. Recorder 27 records the halftone input image on photographic media and delivers that media to photoprocessor 28 for chemical processing and development. Output from photoprocessor 28 is then characterized in one of two categories, namely, uncalibrated halftone output images 29 or calibrated halftone output images 30. Uncalibrated output 29 is then used to characterize the halftone response of the imagesetter, film and photoprocessor system for different combinations of media, resolution and halftone frequency 45, 46 and 47, respectively.

Test pattern 10 shown in FIG. 1 can thereby be encoded from page description language 25 to begin the calibration process. Namely, description language of a halftone image corresponding to test pattern 10 is sent via channel 31 to RIP 26. Test pattern 10 is then ultimately imaged at a predetermined media 45, resolution 46 and halftone frequency 47. First, the gray values in test pattern 10 are mapped through transfer function 33. Note that line art and text, through black in a positive page image, is still considered a gray value of 100%, and is passed through transfer function 33. Not shown, and not germane to this discussion, are the mechanisms that RIP 26 uses to generate the actual text in line art images included in a complete page description.

For purpose of forming calibration sets and characterizing the halftone response, transfer function 33 is set to the unitary function; that is the output gray value equals the input value. Also possible, and equally usable, is an inverse linear transfer function, in which the percent gray value is subtracted from 100% to invert the image. The output value equals 100% minus the input value. Unity or inverse transfer function 33 is set at user direction through page description language 25.

After transfer function 33 (which may have caused a negative image), gray values 34 pass to halftone dot generation section 35. RIP 26 then creates a separate halftone dot proportional in size, usually linear, to each gray value 34. Halftone dots representing each gray value 36 are placed in raster memory 37. Raster memory 37 contains a pixel-by-pixel translation of page description 25. When page description 25 has been completely processed, page image 38 is passed through a conditional invertor 39. Invertor 39 is enabled to produce a negative at user direction through page description language 25.

After the pixel stream 40 leaves RIP 26, it enters recorder 27 and is passed through a similar conditional invertor 41. This invertor 41 is also enabled under user direction through page description language 25. From invertor 41, the pixel stream is used to modulate a light source scanning in raster fashion 42 which then produces a photographic media of the latent image corresponding to test pattern 10 representation of the uncalibrated halftone input image.

The film with the exposed test pattern 43 corresponding to halftone input image test pattern 10, is then developed by photoprocessor 28. Photoprocessor 28 has been used extensively in the art, and therefore, it is not discussed herein.

The processor 28 which produces uncalibrated test pattern images 44 is activated for each combination of media, resolution and halftone frequency desired, 45, 46 and 47, respectively. Test pattern films 43 are divided into a specific media category 45 (film or paper), resolution 46 (high or low) and halftone screen frequencies 47 (multiple lines per inch). Note that while FIG. 2 shows two types of media 45, two resolution values 46 and three halftone screen frequencies 47, it is clearly within the scope and spirit of this invention to include multiple values beyond two types of media, two resolution values and three halftone screen frequencies.

Upon obtaining media 45, resolution 46 and screen frequencies 47 of uncalibrated output 29, the operator can then measure the test pattern gray scales 15 and 16 (shown in FIG. 1) with a standard dot-area densitometer 48. The record of these measurements, along with output sense (either positive or negative), media, exposure intensity, resolution and halftone frequency constitute a calibration set 49. A plurality of calibration sets 50 may be created, stored in RIP 26, and used with transfer function 33 to linearize the imagesetter's halftone response. One or more calibration sets 49 are transferred to RIP 26 in a manner well known in the art. RIP 26 is constructed with a selector 51 and calibration function 52. Thus, selector functions to select a given calibration set 50 within RIP 26 to provide linearized, calibrated halftone response output.

Once calibration sets 50 are obtained and transfer function 33 is in place, subsequent halftone input images can then be calibrated in accordance with calibration sets 50 and transfer function 33. Accordingly, at the start of processing any subsequent halftone input image in the form of subsequent page description language 32, selector 51 is called upon to select a corresponding calibration set 50 appropriate to the current system conditions such as e.g., exposure intensity 21, media 45, resolution 46, screen frequency 47, etc. Current media 45 is determined by a one-to-one mapping process with the exposure intensity 54 which is determined from recorder 27 by query. For example, all film test strips 10 are exposed at the same exposure intensity setting 21 and all paper test strips are exposed at the same exposure intensity setting 21. A requirement of the present invention is that exposure intensity settings 21 be different for each different media 45 (paper or film). In practice, this causes no difficulty. In the event that two different media are properly exposed at the same exposure intensity setting 21, the present invention requires that one media be shifted in exposure intensity. This shift is at most 0.4%, a negligible amount. In this manner, selector 51 can determine which group of calibration set is appropriate to the current media 45 by examining the exposure intensity setting only.

Next, selector 51 narrows the list of possible sets by examining the current resolution 53 from recorder 27. The halftone parameters 55, notably halftone screen frequency, are determined either from default within RIP 26 or may be overridden by page description language 25. Once media 45, resolution 46 and screen frequency 47 are determined, selector 51 examines the group of calibration sets 50 for a match, and if a match is found, it presents the found calibration set to the calibration function 52. In the event that a calibration set match is not found, selector 51 presents a no set, which has the net effect of providing unadjusted halftones. This method of operation has the advantage of not disabling output in the event that halftone input images could not be calibrated—a desirable outcome to many operators. In another embodiment of the present invention, selector 51 terminates current page description 25 if a calibration set could not be found.

Note that in the current art, page description 25 may specify any halftone screen frequency 47 from the practical limits of 40 lines per inch to 300 lines per inch. It would be unreasonable and unworkable to construct a calibration set 50 for every halftone frequency that could be specified. Evidence from testing has shown that a given calibration set at a given halftone screen frequency is accurate at a frequency significantly different from that at which the set was measured. For instance, a calibration set measured at 150 lines per inch may be accurate within a tolerance of 1% for ±15 lines per inch. It is a feature of the present invention that the operator may specify a halftone frequency range for which a calibration set may apply. Selector 51 matches the current halftone frequency to a halftone range, consisting of a starting frequency spanning to an ending frequency, inclusive. The halftone ranges for calibration set at a given exposure intensity 21 and a given resolution 46 are not allowed to overlap, thereby yielding the possibility of only one match. This method has the significant advantage of not allowing the operator to vary the number of calibration sets for various frequencies depending upon the operator's accuracy requirements.

As gray values 32 are specified in page description language 25 where halftone input images are to be calibrated, gray values are mapped through transfer function 33. Transfer function 33 is a convenient way to map user gray values to values that are presented to dot generator 35 of RIP 26 so that the end result is a calibrated halftone output image. Transfer function 33, however, has multiple uses. Page description language 25 may specify an inverted transfer function 33 in order to produce a negative image. In this case, the invention concatenates calibration function 52 with the one specified through page description language 25. Care is taken to ensure that calibration function 52 is not concatenated more than once.

The output sense can be provided by either the default transfer function 33 or of one specified via page description 56 provided to calibration function 52, along with the sense of conditional RIP invertor 57, and the sense of conditional recorder invertor 58. These various data inputs provide the present invention with bases for calibrating or mapping within calibration function 52. Mapping or calibration according to sense of conditional RIP invertor 39 and conditional recorder invertor 41 is described with the aid of FIG. 3.

Figure 3:
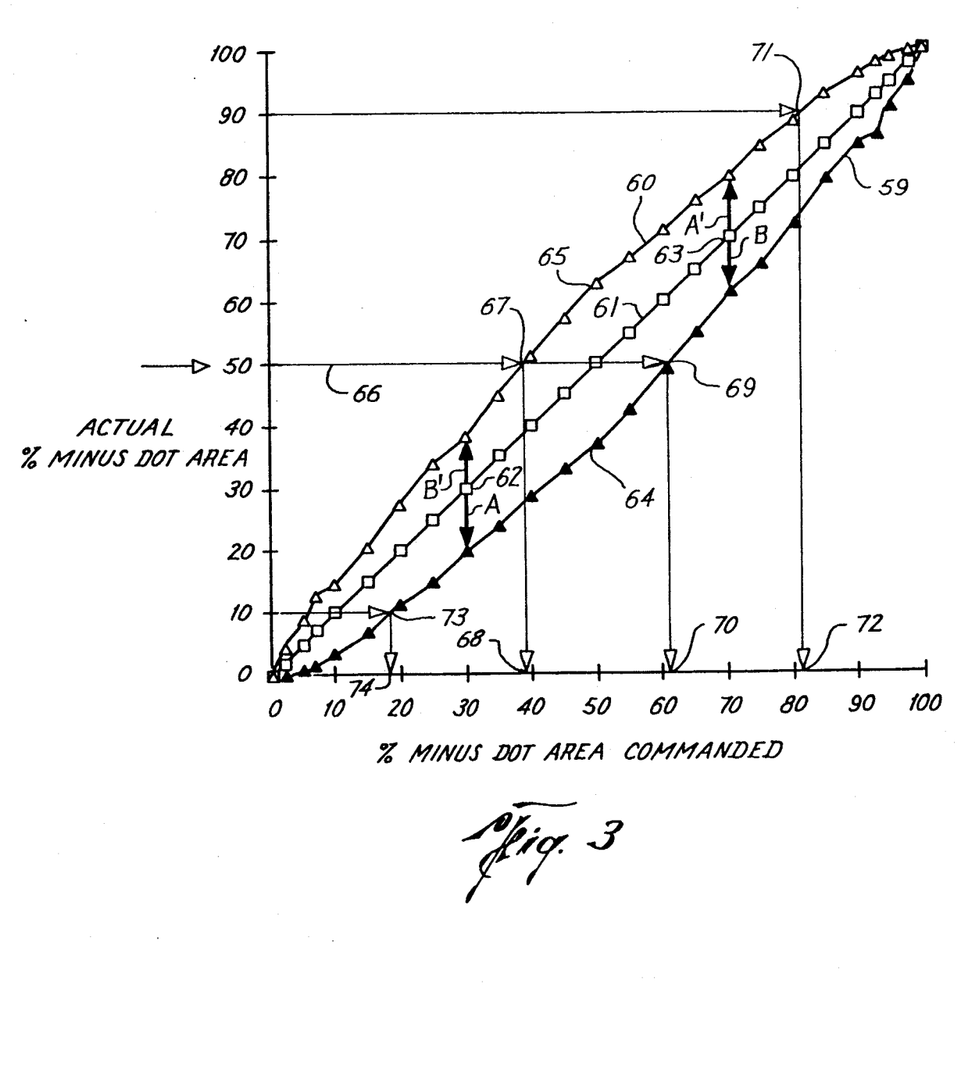

Shown in FIG. 3 is a graphical depiction of the halftone response contained in a typical calibration set. The ordinate and abscissa are in % minus dot area, a typical and widely used halftone measurement for negatives. Dot area measurements are usually spoken of in terms of printed dots on the page. That is, a 10% dot area means that 10% of a given area is covered by dots, or is mostly white. But for a negative that would be used to produce a printing plate that would make a 10% dot area, the area is mostly black, or 90% of the area on the negative is covered by dots. For convenience, this area is called a 10% minus dot area, since the negative produces a 10% dot.

Negative curve 59 of FIG. 3 results if the halftone measurement taken on gray scales 15 and 16 of FIG. 1 were taken from a negative; rather, they were minus dot measurements. If so, positive curve 60 can be constructed from curve 59. In the alternative, if halftone measurements taken on gray scales 15 and 16 were taken from a positive, then they are plotted on curve 60 and negative curve 59 is constructed from positive curve 60. Curve 61 is the unity function, and is shown for reference.

Curve 60 is a complementary curve constructed from curve 59 in the following manner: for each % minus dot area commanded, such as point 62, there is a corresponding point 63 for positive dots, which is simply expressed as 100% less the minus dot point value. At point 62, the difference of the commanded value to the actual value recorded, the distance A, is transferred to the corresponding point 63, in opposite sense, as the distance A'. In like manner, point 63's distance to the negative curve B is transferred to point 62 in opposite fashion as distance B'. the magnitude of A equals A', and the magnitude B equals B' for each corresponding point along curve 61. At points 64 and 65, A equals A' equals B equals B'.

It is a feature of the present invention that the measurement points are symmetric about 50%. That is, a measurement of 2% corresponds to a measurement of 98%, a 5% to 95%, a 7% to 93%, etc. While not mandatory for construction of the complementary curve, this arrangement merely simplifies the algorithms and assures accuracy.

The purpose of the calibration function 52 is to invert the halftone response function from the selected calibration set 50, depending upon the output sense conditions 56, 57 and 58. The present invention relies on the fact that the measured halftone response is usable regardless of the state of the three output sense conditions 56, 57 and 58. Calibration functions 52 is dependent on the individual output sense conditions. Because the effect of the conditional pixel invertors 39 and 41 can be combined through the use of the "exclusive or" function, there are four principal sense conditions to deal with: 1) the transfer function 56 (Ntf) is positive, and invertors 39 and 41 produce a positive for a positive image; 2) Ntf is negative and the invertors 39 and 41 produce a positive for a negative image; 3) Ntf is positive and the invertors 39 and 41 produce a negative for a negative image; and 4) Ntf is negative and the invertors 39 and 41 produce a negative for a positive image.

The above four principal sense conditions are described hereinbelow. In the case where Ntf is positive and invertors are also positive, the dot area value from transfer function 33 is in positive dot, so it is first converted to minus by subtracting from 100%. For an input value of 50%, calibration function follows line 66 until in intersects curve 60 at point 67. This occurs at a given percent dot area-to-command point 68. The value to command from point 68 is then subtracted from 100% and output along path 34 to dot generator 35 of FIG. 2. Other transfer values are computed in like manner by intersecting curve 60. In the case where Ntf is negative and invertors 39 and 41 are positive, the dot area is used directly. For an input value of 50%, calibration function 52 follows line 66 until in intersects curve 59 at point 69. This occurs at a given percent dot area-to-command point 70. The value to command from point 70 is then used directly and output along path 34 to dot generator 35 of FIG. 2. Note that the commanded values for 50% positive and 50% negative are identical, and the commanded value for 25% positive and 75% negative are identical. It is worth mentioning at this point that the use of two curves is not mandatory. The mathematical relationship between positive and negative dot area measurements is straight forward, but the use of two curves here is advantageous for recording the halftone response measurement and to help understand the operation of transfer function 33 and calibration of function 52. If Ntf is positive and invertors 39 and 41 are negative, the dot area value from transfer function 33 is used directly. For this case, however, calibration function 52 intersects the positive curve 60 even though a negative image will ultimately be formed. From an input value of 90%, the curve is intersected at point 71, for a commanded value at point 72. The command value at point 72 is used directly and is sent along path 34 to the dot generator 35. Still further, if Ntf is negative and invertors 39 and 41 are negative, the dot area value from transfer function 33 is inverted by subtracting from 100%. For an input value of 90%, this converts to 10%. The calibration function intersects the negative curve 59, even though a positive image will ultimately be formed. From an input value of 10%, the curve is intersected at point 73. The value to command from point 73 is then subtracted from 100% and is sent along path 34 to dot generator 35.

Note that the last two examples shown above produce the same absolute gray value output. Again, the use of two curves is not mandatory but is helpful for explanation purposes.

The invention herein described assumes short term stability in the photoprocessor 28, photographic media 43 and photo exposure mechanism 42. Significant effort within the current art is devoted to assuring the stability of these three items. In practice, the calibration sets 50, which are a function of these three items, have been shown to be accurate for periods exceeding four weeks, provided there are good controls on the photographic processes. In the event of major change, such as a change in the type of film, chemicals or processor, the existing calibration sets 50 may need to be discarded and new ones created. The present invention provides for easy verification of the calibration set accuracy and can be easily changed.

The current embodiment of the present invention also assumes that dot generator 35 on FIG. 2, produces a fixed dot shape that varies only with gray value requested. In another embodiment of the invention, the dot shape is allowed to change. This replicates the groups 45, 46 and 47 for each different dot shape. Dot shape is also included in the calibration sets 50 and the dot shape is taken into account by selector 51 with input from dot generator 35.

The foregoing description of the present invention has been directed to particular preferred embodiments. It will be apparent, however, to those skilled in the art that modifications and changes in both apparatus and method may be made without departing from the scope and spirit of the invention. For example, the present invention contemplates functioning with any standard raster image processor for any form of output media. Furthermore, the present invention also contemplates use in any standard personal computer which can programmably receive calibration sets and apply those calibrations sets to any form of input page description language. Therefore, it is the applicant's intention in the following claims to cover all such equivalent modifications and variations which fall within the true spirit and scope of this invention.

What is claimed is:

1. A method of calibrating halftone output images from an imagesetting device, comprising:
providing a halftone input image, each said input image including a plurality of requested gray value densities, each said input image being a function of image resolution, exposure intensity and screen frequency;
reproducing said halftone images onto a photographic media;
chemically processing said media to manifest the exposure thereon;
measuring the density of each said requested gray value of each said halftone input image by a densitometer;
generating a plurality of calibration sets in accordance with said measuring step, each said calibration set corresponding to any variation between said requested gray value density and said respective measured density reading for each said halftone input image at various said image resolutions, said exposure intensity and said screen frequency; and,
converting subsequent plurality of halftone input images to a respective plurality of calibrated halftone output images according to changes made to said subsequent halftone input images by said calibration sets.

2. The method as recited in claim 1, wherein said plurality of calibrated halftone output images each being a function of image resolution, exposure intensity and screen frequency, and each said plurality of calibrated halftone output images being programmable by at least one said calibration sets.

3. The method as recited in claim 1, further comprises storing said calibration sets in a local memory medium.

4. The method as recited in claim 1, wherein said converting step further comprises converting either positive or negative sense uncalibrated halftone input images to positive sense calibrated halftone output images.

5. The method as recited in claim 1, wherein said converting step comprises converting either positive or negative sense said uncalibrated halftone input images to negative sense calibrated halftone output images.

6. The method as recited in claim 1, wherein said step of converting further comprises programmably selecting a particular calibration set of said plurality of calibration sets to be used to convert one of said subsequent plurality of halftone input images depending upon said imagesetting device current settings of said image resolution, said exposure intensity and said screen frequency.

7. The method as recited in claim 1, wherein said step of generating said calibration sets further comprises selecting photographic the type of photographic media according to said exposure intensity.

8. A method of calibrating halftone output images from an imagesetting device, comprising:
providing a halftone input image, each said halftone image having a set of requested gray value densities, wherein each gray value density is dependent upon image resolution, exposure intensity and screen frequency of said input image;
reproducing said halftone images onto a photographic media;
chemically processing said media to manifest the exposure thereon;
measuring the density of each gray value of each halftone input image by a densitometer for chosen values of said image resolution, said exposure intensity and said screen frequency;

generating a plurality of calibration sets corresponding to the variation between said requested gray value density and the density measured by said densitometer for each said halftone input image at varying values of said image resolution, said exposure intensity, said screen frequency and whether the resultant said halftone output images are placed on either paper or film; and, mapping said halftone input images through a transfer function process capable of transferring either positive or negative gray value densities of said halftone input images to either positive or negative gray value densities of said halftone output images.

9. A method of producing calibrated halftone output images from an imagesetting device, comprising:

providing a halftone input image, each said halftone image having a set of requested gray values corresponding to varying density readings wherein each gray value is dependent upon image resolution, exposure intensity and screen frequency selected;

reproducing said halftone images onto a photographic media;

chemically processing said media to manifest the exposure thereon;

measuring the density of each gray value of each halftone input image by a densitometer for chosen values of said image resolution, said exposure intensity and said screen frequency;

generating a plurality of calibration sets corresponding to the variation between said requested gray value density and the density measured by said densitometer for each said halftone input image at varying values of said image resolution, said exposure intensity, said screen frequency and whether the resultant said halftone output images are placed on either paper or film;

mapping subsequent halftone input images through a transfer function process to produce positive or negative sense gray values for any subsequent halftone input image;

storing said calibration sets and said transfer function having local memory medium;

inputting said subsequent halftone input images, each said subsequent halftone input image having a plurality of gray value densities; and, converting said gray value densities of each said subsequent halftone input image to a respective gray value densities of said calibrated halftone output images according to programmed retrieval of selected said stored calibration sets and said transfer function.

10. The method as recited in claim 9, wherein said converting step further comprises applying said transfer function to at least one gray value density of each said subsequent halftone input image to generate either positive or negative sense of said calibrated halftone output image.

11. An apparatus for generating calibrated halftone output images from an imagesetting device, comprising:

a halftone input image including a plurality of gray values, each said gray value having a requested density value;

means for converting said input image into a page description language;

a raster image processor having a channel for receiving said page description language and converting said language into a raster representation of said halftone input image;

a recorder connected to said raster image processor, said recorder includes a modulated light source to expose said raster representation onto a photographic media;

a photoprocessor configured to receive said photographic media for chemically developing said media;

a densitometer for measuring amount of density of each said gray value of said developed photographic medium;

a computer for receiving a plurality of programmed calibration sets, said sets include variations between measured density of said densitometer and corresponding said requested density;

a subsequent uncalibrated halftone input image, said subsequent halftone input image converted into said page description language and inputted to said computer;

a selector accessed by said computer for receiving said subsequent halftone input images and selecting a corresponding said calibration set stored in said computer to programmably adjust said uncalibrated halftone input image to said calibrated output halftone image; and, mapping means for mapping either positive or negative sense representations of said subsequent uncalibrated halftone input images through said raster image processor, said recorder, said photoprocessor and outputted as calibrated said halftone output images on said photographic media.

12. The apparatus as recited in claim 11, wherein each said calibration set comprises means for calibrating gray values of said subsequent uncalibrated halftone input images as a function of image resolution exposure intensity and screen frequency.

13. The apparatus as recited in claim 11, wherein said photographic media is paper.

14. The apparatus as recited in claim 11, wherein said photographic media is film.

* * * * *

UNITED STATES PATENT AND TRADEMARK OFFICE
CERTIFICATE OF CORRECTION

PATENT NO. : 5,170,257
DATED : December 8, 1992
INVENTOR(S) : James M. Burns

It is certified that error appears in the above-indentified patent and that said Letters Patent is hereby corrected as shown below:

Column 16, claim 12, line 48, after resolution, insert ","

Signed and Sealed this

Nineteenth Day of October, 1993

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,170,257

DATED : December 8, 1992

INVENTOR(S) : James M. Burns

It is certified that error appears in the above-identified patent and that said Letters Patent is hereby corrected as shown below:

Column 1, line 19, after " whatsoever." insert --A complete copy of the Program Printout Appendix is included. --

Column 13, after line 63, and before "What is claimed is" insert the Appendix, as shown on the attached pages.

Signed and Sealed this

First Day of April, 1997

Attest:

BRUCE LEHMAN

Attesting Officer

Commissioner of Patents and Trademarks

REEXAMINATION CERTIFICATE (2471st)
United States Patent [19]
Burns

[11] B1 5,170,257
[45] Certificate Issued Feb. 7, 1995

[54] METHOD AND APPARATUS FOR CALIBRATING HALFTONE OUTPUT FROM AN IMAGE-SETTING DEVICE

[75] Inventor: James M. Burns, Austin, Tex.

[73] Assignee: Southwest Software, Inc., Austin, Tex.

Reexamination Request:
No. 90/003,294, Dec. 22, 1993

Reexamination Certificate for:
Patent No.: 5,170,257
Issued: Dec. 8, 1992
Appl. No.: 592,022
Filed: Oct. 2, 1990

Certificate of Correction issued Oct. 19, 1993.

[51] Int. Cl.$^6$ ............................................. H04N 1/23
[52] U.S. Cl. ................... 358/298; 358/455; 358/456; 358/458; 358/461
[58] Field of Search ............... 358/298, 455, 456, 458, 358/534, 536, 406, 504

[56] References Cited

U.S. PATENT DOCUMENTS

4,075,662  2/1978  Gall ..................................... 358/280

OTHER PUBLICATIONS

Series 2000—Graphics 2000 Linotype sales brochure—printed Feb., 1988—Copyright 1988.
Series 2000—Graphics 2000 User Manual—issued Mar., 1989—Copyright 1989.
Linotronic, 300/500 R Imagesetter Interface Manual—issued Feb., 1988—Copyright 1988.
Linotronic 300/500 CORA Operation Manual—issued Apr., 1987 Copyright 1987.
Aldus Printer Description File (reference AF filed by Burns with Information Disclosure Statement).
LinoCal 1.0 a/k/a Calibration Utility of Linotype-Hell corresponding to the calibration presently employed in later versions of the Linotype-Hell utility program such as utility 6.0 and 7.0.
Color Calibration Software by Technical Publishing Services, Inc.
Kita Calibration System for Linotronic—May 1989.
Goertzel, G. and Thompson, G., "Digital halftoning on the IBM 4250 Printer", *IBM J. Res. Develop.* vol. 31, No. 1, (1987).
Webster, J., "Radius opens color calibration system", *MacWeek* (1990).
Postscript Language Reference Manual—Aug. 1986.

*Primary Examiner*—Scott A. Rogers

[57] ABSTRACT

An improved method and apparatus for calibrating halftone output images is provided which calibrates subsequent halftone input images with varying imagesetter outputs such as image resolutions, exposure intensities and screen frequencies. Calibration is programmably achieved by programmably selecting a specific calibration set for each corresponding uncalibrated halftone input image. The selected calibration set and mapping transfer function automatically compensates or adjusts the uncalibrated input image for any value of resolution, intensity and screen frequency to produce a calibrated halftone output image in either positive or negative sense output and usable on either paper or film photographic medium. Once the calibrated halftone output is programmably produced, it can then be photoprocessed according to conventional chemical processing means. The present invention represents a substantial improvement in precision and speed by which halftone output images are calibrated in the typeset industry.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11-14 is confirmed.

Claim 6 is cancelled.

Claims 1, 3, 7, 8, and 9 are determined to be patentable as amended.

Claims 2, 4, 5 and 10, dependent on an amended claim, are determined to be patentable.

1. A method of calibrating halftone output images form an imagesetting device, comprising:
    providing a halftone input image, each said input image including a plurality of requested gray value densities, each said input image being a function of image resolution, exposure intensity and screen frequency;
    reproducing said halftone images onto a photographic media;
    chemically processing said media to manifest the exposure thereon;
    measuring the density of each said requested gray value of each said halftone input image by a densitometer;
    generating a plurality of calibration sets in accordance with said measuring step, each said calibration set corresponding to any variation between said requested gray value density and said respective measured density reading for each said halftone input image at various said image resolutions, said exposure intensity and said screen frequency; and,
    converting *a* subsequent plurality of halftone input images to a respective plurality of calibrated halftone output images according to changes made to said subsequent halftone input images by said calibration sets, *by programmably selecting a particular calibration set of said plurality of calibration sets to be used to convert one of said subsequent plurality of halftone input images depending upon said imagesetting device current settings of said image resolution, said exposure intensity and said screen frequency.*

3. The method as recited in claim 1, further [comprises] *comprising* storing said calibration sets in a local memory medium.

7. The method as recited in claim 1, wherein said step of generating said calibration sets further comprises selecting [photographic] *the type of photographic* media according to said exposure intensity.

8. A method of calibrating halftone output images from an imagesetting device, comprising:
    providing a halftone input image, each said halftone image having a set of requested gray value densities, wherein each gray value density is dependent upon image resolution, exposure intensity and screen frequency of said input image;
    reproducing said halftone images into a photographic media;
    chemically processing said media to manifest the exposure thereon;
    measuring the density of each gray value of each halftone input image by a densitometer for chosen values of said image resolution, said exposure intensity and said screen frequency;
    generating a plurality of calibration sets corresponding to the variation between said requested gray value density and the density measured by said densitometer for each said halftone input image at varying values of said image resolution, said exposure intensity, said screen frequency and whether the resultant said halftone output images are placed on either paper or film; and
    *programmably* mapping said halftone input images through a transfer function process capable of transferring either positive or negative gray value densities of said halftone input images to either positive or negative gray value densities of said halftone output images.

9. A method of producing calibrated halftone output images from an imagesetting device, comprising:
    providing a halftone input image, each said halftone image having a set of requested gray values corresponding to varying density readings wherein each gray value is dependent upon image resolution, exposure intensity and screen frequency selected;
    reproducing said halftone images onto a photographic media;
    chemically processing said media to manifest the exposure thereon;
    measuring the density of each gray value of each halftone input image by a densitometer for chosen values of said image resolution, said exposure intensity and said screen frequency;
    generating a plurality of calibration sets corresponding to the variation between said requested gray value density and the density measured by said densitometer for each said halftone input image at varying values of said image resolution, said exposure intensity, said screen frequency and whether the resultant said halftone output images are placed on either paper or film;
    mapping subsequent halftone input images through a transfer function process to produce positive or negative sense gray values for any subsequent halftone input image;
    storing said calibration sets and said transfer function [having] *in a* local memory medium;
    inputting said subsequent halftone input images, each said subsequent halftone input image having a plurality of gray value densities; and
    converting said gray value densities of each said subsequent halftone input image to a respective gray value densities of said calibrated halftone output images according to programmed retrieval of selected said stored calibration sets and said transfer function.

* * * * *